United States Patent [19]

Nattel

[11] Patent Number: 4,723,796

[45] Date of Patent: Feb. 9, 1988

[54] CONNECTOR FOR CORRUGATED TUBING

[75] Inventor: William Nattel, Montreal, Canada

[73] Assignee: Commander Electrical Materials, Inc., Saint-Jean-sur-Richelieu, Canada

[21] Appl. No.: 8,945

[22] Filed: Jan. 30, 1987

[30] Foreign Application Priority Data

Feb. 6, 1986 [CA] Canada ................................ 501285

[51] Int. Cl.[4] .......................... F16L 5/00; F16L 37/14
[52] U.S. Cl. .................... 285/161; 285/162; 285/169; 285/305; 285/903
[58] Field of Search ............... 285/305, 903, 161, 162, 285/169, 305, 903

[56]  References Cited

U.S. PATENT DOCUMENTS

| | | | |
|---|---|---|---|
| 2,013,660 | 9/1935 | Lauer | 285/305 |
| 2,021,241 | 11/1935 | Mall | 285/305 X |
| 3,436,105 | 4/1969 | Miklya | 285/161 X |
| 4,099,744 | 7/1978 | Kutnyak et al. | 285/7 |
| 4,171,834 | 10/1979 | Abner | 285/373 |
| 4,368,904 | 1/1983 | Lanz | 285/175 |
| 4,423,891 | 1/1984 | Menges | 285/305 |
| 4,440,425 | 4/1984 | Pate et al. | 285/161 |
| 4,468,535 | 8/1984 | Law | 285/162 X |
| 4,513,998 | 4/1985 | Grossauer | 285/308 |
| 4,526,411 | 7/1985 | Bartholomew | 285/305 |
| 4,561,682 | 12/1985 | Tisserat | 285/305 |

Primary Examiner—Thomas F. Callaghan
Attorney, Agent, or Firm—Neil W. McDermid; William H. James

[57]  ABSTRACT

A connector for corrugated tubing, such as electrical conduit, provides easy installation and has superior resistance to pull out as well as high impact strength. The connector has a body with two slots on each side and a U-shaped locking element which snaps over the corrugated tubing. The locking element locks onto two portions of the circumference of the tubing, substantially symmetrically on both sides.

10 Claims, 12 Drawing Figures

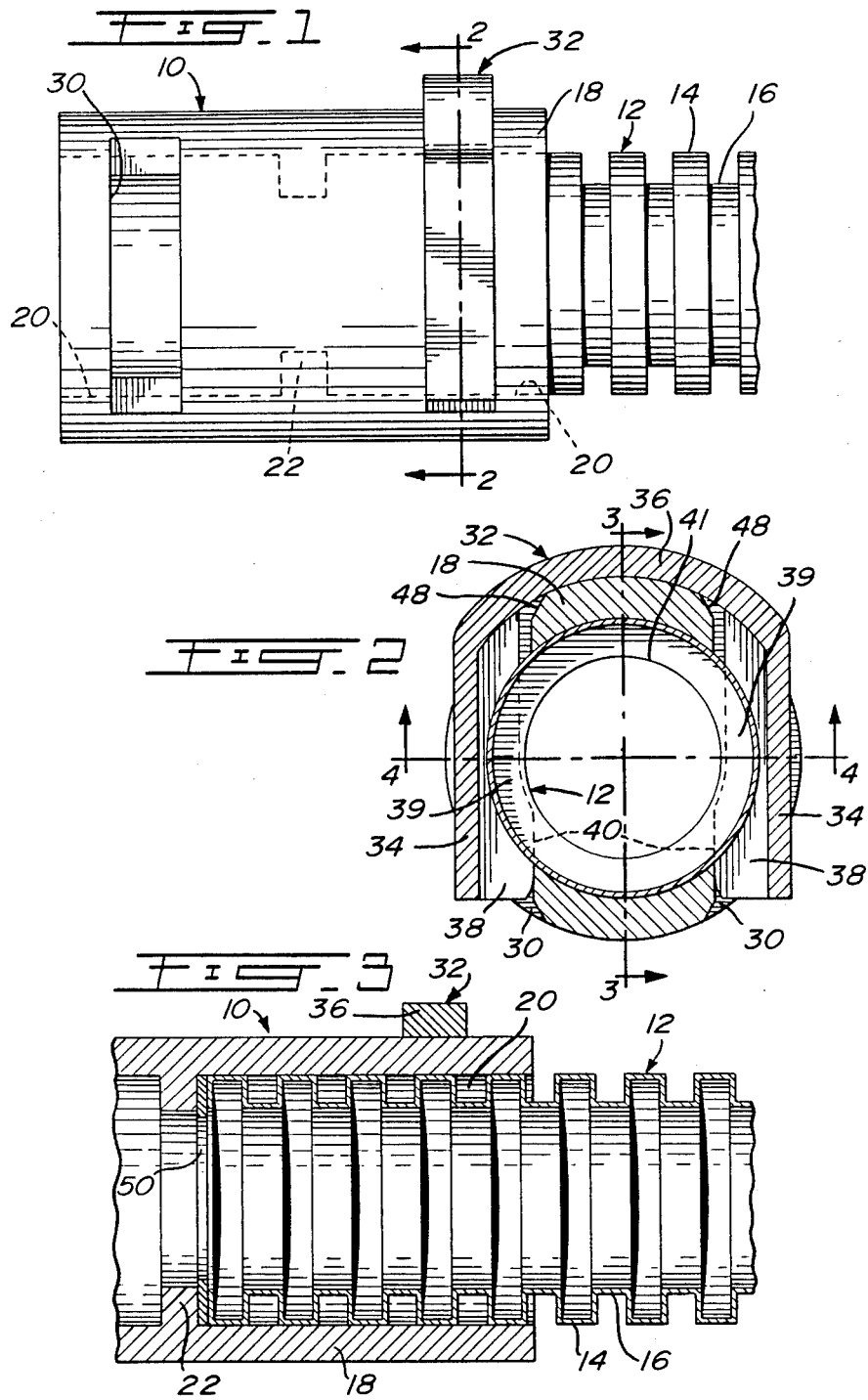

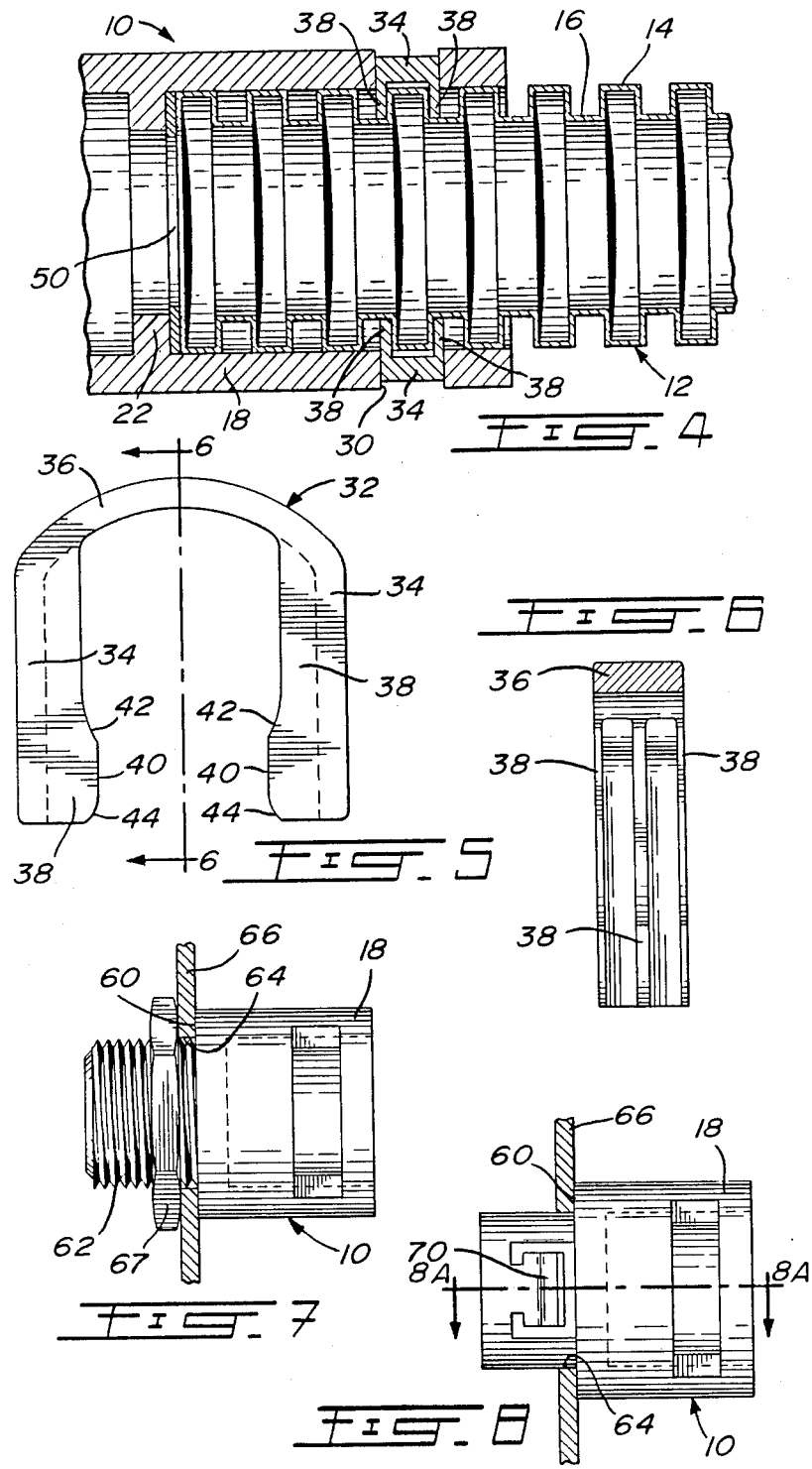

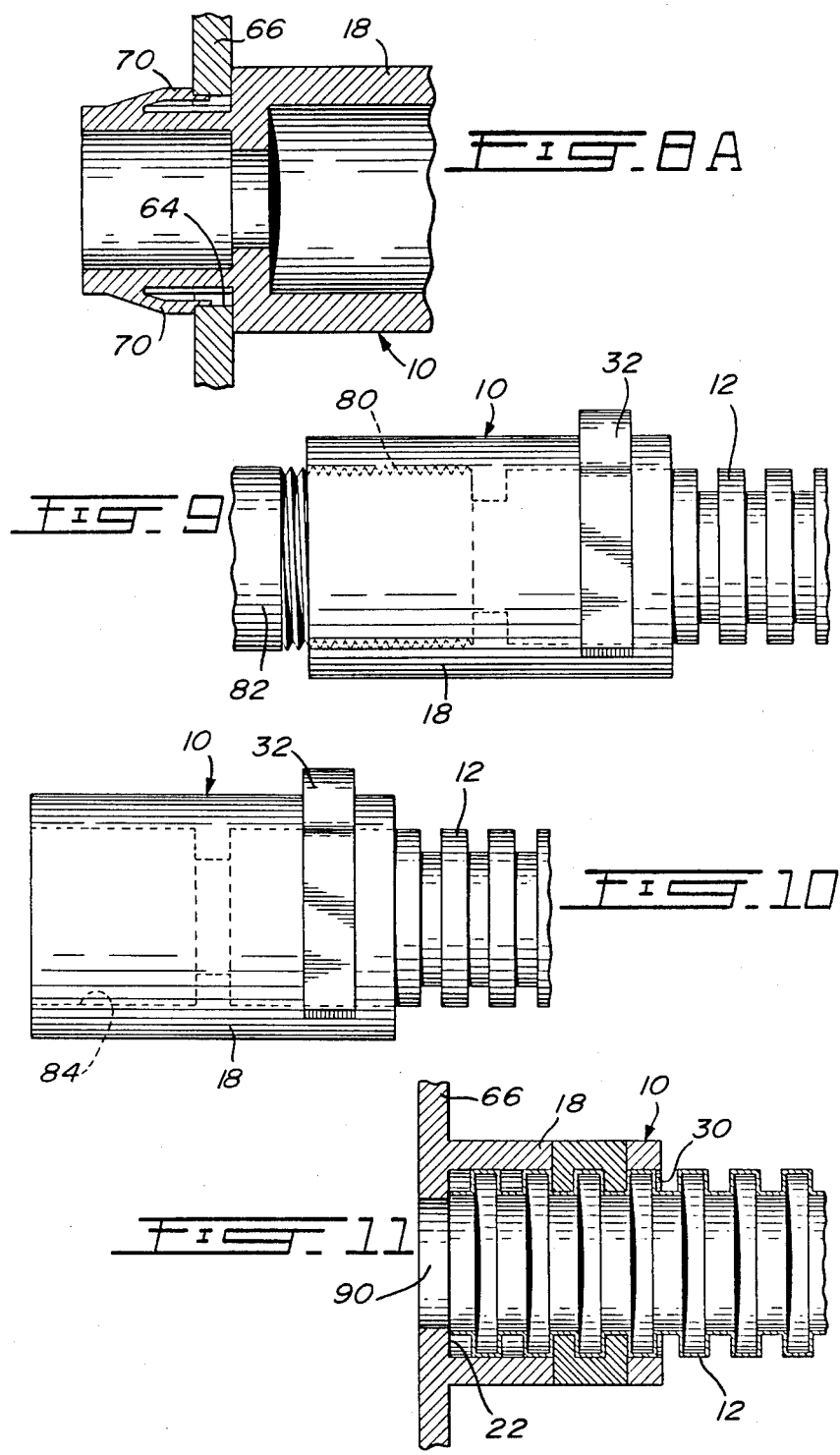

CONNECTOR FOR CORRUGATED TUBING

The present invention relates to a connector for attaching corrugated tubing, such as electrical conduit, to enclosures, for joining two ends of corrugated tubing together or for joining corrugated tubing to other types of tubing, conduit or pipe.

There are presently several types of connectors on the market used to join two lengths of corrugated electrical conduit together or to attach a corrugated conduit to an enclosure or other type of conduit or pipe. One type of connector requires the use of adhesive cement for the installation and is fairly strong. However, the installation time is long as it is necessary to wait for the cement to harden. Another available type of connector is easy to install but has a relatively low resistance to pull out and low impact strength. The pull out and impact strength of the connector are important, particularly when the conduit is located in place before pouring concrete. Any breakage of the connector or separation of an end of the conduit from the connector can result in the concrete plugging the conduit or enclosure which requires expensive connections.

Plastic connectors for corrugated tubing utilizing clips have been used in the past. One example of such a connector is that shown by Lanz in U.S. Pat. No. 4,368,904. Lanz shows a C-shaped locking clip that fits into an opening in a connector body and locks to the body. The C-shaped locking clip locks onto one portion of the circumference of the corrugated tubing.

The present invention provides a connector for corrugated tubing such as electrical conduit which is easy to install and has a locking element which can be installed from either side of the conduit thus is easier to install in inaccessible locations. Furthermore the present invention provides a connector for corrugated tubing which offers superior resistance to pull out as well as high impact strength. The present invention provides a connector having a body with two slots on each side and a U-shaped locking element which snaps over the corrugated tubing and lock to the tubing. Furthermore, the locking element locks onto two portions of the circumference, substantially symmetrically on both sides.

The present invention provides a connector for corrugated tubing having parallel circular ridges therein spaced apart axially along the tubing and having grooves between the ridges, the connector comprising a substantially cylindrical body with an aperture at a central axis, extending from one end of the body to an internal tubing stop, the aperture adapted to accommodate a length of corrugated tubing with several ridges; two slots in the side of the body, the slots in a plane substantially perpendicular to the central axis of the body and equispaced on each side of the central axis; U-shaped snap lock element, the element having two legs fitting into the two slots with a central internal portion of the element resting on an outside surface of the body, each leg having at least one internal facing rib adapted to fit into a groove between the ridges on the tubing to grip the tubing substantially symmetrically on opposing sides, the rib on each leg having an internal facing protrusion at the end of each leg adapted to snap over the tubing and lock the element to the tubing.

In other embodiments of the invention, the U-shaped snap lock element has two or three ribs on each leg adapted to fit into three grooves between ridges on the tubing. The ribs preferably contact over half the circumference of the corrugations on the tubing. In one embodiment a seal may be provided adjacent the internal tubing stop adapted to seal the end of the length of the tubing.

The type of connector may be one wherein two ends of corrugated tubing are connected together, the connector may be formed integrally with an enclosure, alternatively, the connector may have an external screw thread or snap lock action for fitting into a hole in an enclosure wall. In yet another embodiment, the connector can have a tubular portion at one end with either an internal thread therein or an aperture adapted to accept a cylindrical pipe or tube and have it cemented to the tubular portion.

In drawings which illustrate embodiments of the invention;

FIG. 1 is a side elevational view showing one type of connector according to the present invention for joining two lengths of corrugated tubing together;

FIG. 2 is a cross sectional view taken at line 2—2 of FIG. 1;

FIG. 3 is a longitudinal cross sectional view taken at line 3—3 of FIG. 2;

FIG. 4 is a longitudinal cross sectional view taken at line 4—4 of FIG. 2;

FIG. 5 is a side elevational view of a U-shaped snap lock element according to one embodiment of the present invention;

FIG. 6 is a sectional view taken at line 6—6 of FIG. 5;

FIG. 7 is a longitudinal side view showing another embodiment of a connector according to the present invention;

FIG. 8 is a longitudinal side view of yet another embodiment of a connector;

FIG. 8A is a sectional view taken at line 8A—8A of FIG. 8.

FIG. 9 is a longitudinal side view of a further embodiment of a connector;

FIG. 10 is a longitudinal side view taken of a still further embodiment of a connector;

FIG. 11 is longitudinal sectional view of yet another embodiment of a connector.

Referring to FIGS. 1 to 4, a connector 10 is shown for joining two ends of corrugated tubing 12 together. The corrugated tubing 12 has parallel circular ridges 14 equispaced axially along the tubing 12 with grooves 16 between the ridges 14. The ridges 14 have sides which are in some cases almost perpendicular to the axis of the tubing 12. In other types of tubing, the sides have an angular or curved surface. The connector 10 has a body 18 substantially cylindrical in shape with an aperture 20 extending in from each end of the body to a shoulder 22 which represents an internal tubing stop for the end of the corrugated tubing 12. In the connector illustrated, the two apertures 20 permit two ends of corrugated tubing or conduit 12 to be joined together. The apertures 20 are cylindrical and of sufficient size to allow the corrugated tubing 12 to be inserted with a snug fit therein.

Two side slots 30 are provided in the body 18 for each aperture 20. The slots 30 are in a plane which is substantially perpendicular to the central axis of the cylindrical body 18. Both the slots are preferably the same size and equispaced on each side of the central axis. The slots have sufficient width to hold a U-shaped snap lock element 32 with two legs 34 joined by a top member 36 having a curved inside surface adapted to fit the outside surface of the body 18. The legs 34 have ribs 38 extending inwards towards each other and which are adapted to fit in the grooves 16 of the corrugated tubing 12. As shown in FIGS. 3 and 4, two ribs 38 are provided on each leg 34. The number of ribs 38 is dependent partly upon the diameter of the corrugated tubing 12 and on the required retaining force needed to hold the tubing 12 to the connector 10. FIG. 2 shows the area of contact or resistance 39 between the ribs 38 and the sides of the ridges 14 on the tubing 12. This area of resistance 39 is preferably over half the circumference of the side area of the ridge 14 on the tubing 12.

At the bottom of the legs 34, the ribs have internal facing protrusions 40, as can be seen in FIG. 2, which have a dimension across the element 32 between the two protrusions 40 less than the smallest outside diameter of the grooves 16 on the tubing 12. Thus the snap lock element 32 is pushed over the tubing 12 and snaps into place around the grooves 16 to lock the element 32 to the tubing 12 and the curved inside surface of the top member 36 rests on the outside surface of the body 18. The two areas of resistance 39 between the ribs 38 and the ridges 14 16 are positioned substantially symmetrically on each side of the corrugated tubing 12, thus any pull out effect is evenly spread on the tubing.

FIGS. 5 and 6 illustrate another embodiment of a U-shaped snap lock element 32 having three ribs 38 instead of two as shown in FIGS. 3 and 4. The three ribs 38 fit over two ridges 14 on a corrugated tubing 12. The protrusions 40 have a curved upper surface 42 which is substantially the same diameter as the groove 38 on the corrugated tubing 12 and thus grips the corrugated tubing. Furthermore, a chamfered surface 44 is provided on the inside bottom edge of the protrusions 40 to allow the element 32 to open when it is pushed over the body 18, into the two slots 30 and around the tubing 12. Furthermore, as shown in FIG. 2, a chamfered surface 48 may be provided on the body 18 at the top and bottom of the slots 30 to aid in the insertion of the element 32.

As shown in FIGS. 3 and 4, a seal member 50 which is preferably formed of compressible material, may be positioned up against the internal shoulder 22 to assist in sealing the end of the tubing 12 when it is inserted into the aperture 20.

In order to join two lengths of tubing together, the two ends of the tubing 12 are cut approximately perpendicular to the axis and then both sides are inserted into the apertures 20 of the body 18 as shown in FIG. 2. Both U-shaped snap lock elements 32 are then inserted over the body 18 so that the legs 34 pass through the appropriate slots 30 in the body 18 and the ribs 38 fit into the grooves 16 between the ridges 14 on the tubing 12. When both snap lock elements 32 are in place, the both ends of tubing 12 are locked to the connector 10. The elements 32 can be inserted from either side of the body with the legs 34 passing into the two slots 30. The area of resistance 39 between the ribs 38 and the ridges 14 on the tubing is preferably greater than the total cross sectional area 41 of the tubing 12 across the groove 16, thus the joint is at least as strong as the corrugated tubing 12.

FIG. 7 illustrates another embodiment of a connector 10 wherein the body 18 has an external shoulder 60 with an external threaded portion 62 passing through a hole 64 in an enclosure wall 66. A nut 67 holds the connector 10 to the enclosure wall 66 at the shoulder 60. In FIGS. 8, and 8A a threadless connector version is illustrated where in place of the thread, two flexible clip members 70 extend out to a diameter slightly larger than the hole 64 in the enclosure wall 66, and lock the connector 10 to the enclosure wall 66. The connector 10 is pushed through the hole 64 to the shoulder 60, and the flexible members 70 then spring open to hold the connector 10 in place.

FIG. 9 illustrates a female type adapter for the connector 10 wherein an internal thread 80 is provided on the portion of the body 18 opposite the aperture 30. A threaded conduit or pipe 82 fits into the internal thread 80 in the body 18. FIG. 10 shows a hollow cylindrical portion 84 of the body 18 at the opposite end from the aperture 30 for the corrugated tubing 12 which accepts rigid plastic pipe or conduit, and by the use of cement or adhesive can join the connector 10 to the pipe or conduit. FIG. 11 shows a body 18 formed integral with an enclosure wall 66. The hole 90 in the enclosure wall 66 is of a diameter less than that of the diameter of the aperture 30 in the body 18 so that the edge of the enclosure wall 66 adjacent the hole 90 forms the shoulder 22 for the corrugated tubing 12.

Various changes may be made to the embodiments of the invention without departing from the scope of the present invention which is limited only by the following claims.

The embodiments of an invention in which an exclusive property or privilege is claimed are defined as follows:

1. A connector for corrugated tubing having parallel circular ridges therein spaced apart axially along the tubing and having grooves between the ridges, the connector comprising:

a substantially cylindrical body with an aperture at a central axis, extending from one end of the body to an internal tubing stop, the aperture providing a snug fit for the corrugated tubing adapted to accommodate a length of corrugated tubing with several ridges;

two slots in the side of the body, the slots in a plane substantially perpendicular to the central axis of the body and equispaced on each side of the central axis;

U-shaped snap lock element, the element having two legs fitting into the two slots with a central internal portion of the element resting on an outside surface of the body, each leg having two internal facing ribs adapted to fit into two adjacent grooves between one of the ridges on the tubing to grip the ridge and the tubing substantially symmetrically on opposing sides, and prevent the tubing from moving axially within the cylindrical body, the ribs on each leg having internal facing protrusions at the end of each leg adapted to snap over the tubing and lock the element to the tubing.

2. The connector according to claim 1 wherein the U-shaped snap lock element has three ribs on each leg adapted to fit into three grooves between ridges on the tubing.

3. The connector according to claim 1 or claim 2 wherein the ribs on the two legs are adapted to contact over half the circumference of the ridges on the tubing.

4. The connector according to claim 1 or claim 2 including a seal adjacent the internal tubing stop adapted to seal the end of the length of tubing.

5. The connector according to claim 1 or claim 2 wherein the body has apertures at both ends with the internal tubing stop between the apertures, the connector adapted to connect two ends of corrugated tubing together.

6. The connector according to claim 1 or claim 2 wherein the body is formed integrally with an enclosure.

7. The connector according to claim 1 or claim 3 wherein the body has an external screw threaded portion on the other end from the aperture adapted to fit through a hole in an enclosure wall.

8. The connector according to claim 1 or claim 2 wherein the body has a tubular portion on the other end from the aperture extending to a shoulder, and has two flexible lock members on the tubular portion adapted to lock the body through a hole in an enclosure wall at the shoulder on the connector.

9. The connector according to claim 1 or claim 2 wherein the body has a tubular portion with an internal pipe thread therein on the other end from the aperture.

10. The connector according to claim 1 or claim 2 wherein the body has a tubular portion on the other end from the aperture, the tubular portion having a cylindrical aperture adapted to accept a cylindrical pipe or tube.

* * * * *